No. 852,423. PATENTED MAY 7, 1907.
C. E. & R. DRESSLER.
AIR PURIFYING DEVICE.
APPLICATION FILED MAR. 14, 1905.

WITNESSES:
Gustave Dietrich
Edwin W. Dietrich

INVENTORS
Charles E. Dressler
Robert Dressler
BY
Joseph A. Stetson
their ATTORNEY

UNITED STATES PATENT OFFICE.

CHARLES E. DRESSLER AND ROBERT DRESSLER, OF NEW YORK, N. Y.

AIR-PURIFYING DEVICE.

No. 852,423.  Specification of Letters Patent.  Patented May 7, 1907.

Application filed March 14, 1905. Serial No. 250,040.

*To all whom it may concern:*

Be it known that we, CHARLES E. DRESSLER and ROBERT DRESSLER, both citizens of the United States, and both residents of Manhattan borough, New York city, in the county of New York and State of New York, have invented certain new and useful Improvements in Air-Purifying Devices, of which the following is a specification.

Our invention relates to devices for moistening or purifying the atmosphere and is especially adapted for use in hospitals or sick rooms.

The object of our invention is to provide simple and inexpensive means whereby moisture from pure or scented water or disinfecting liquid may be communicated to the atmosphere. Other advantages pertaining to our invention are more fully set forth in the description hereinafter.

Figure 1:
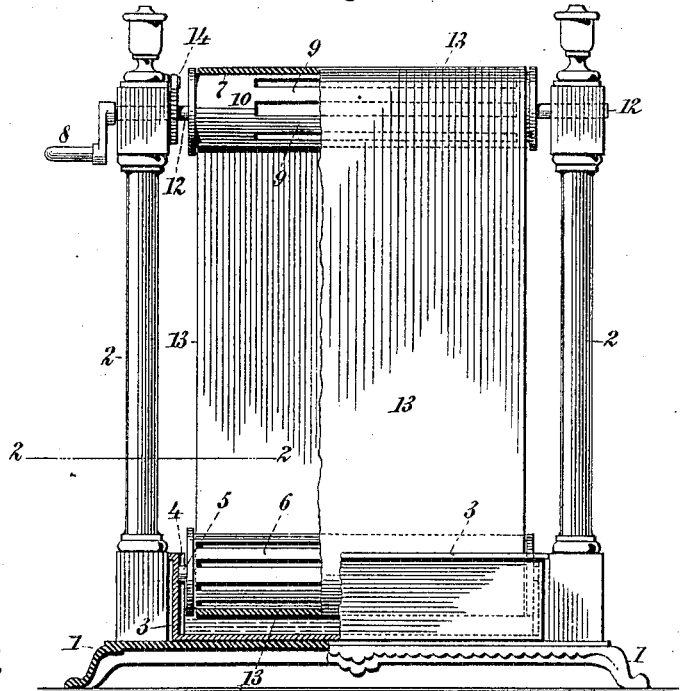
Figure 2:
Figure 3:
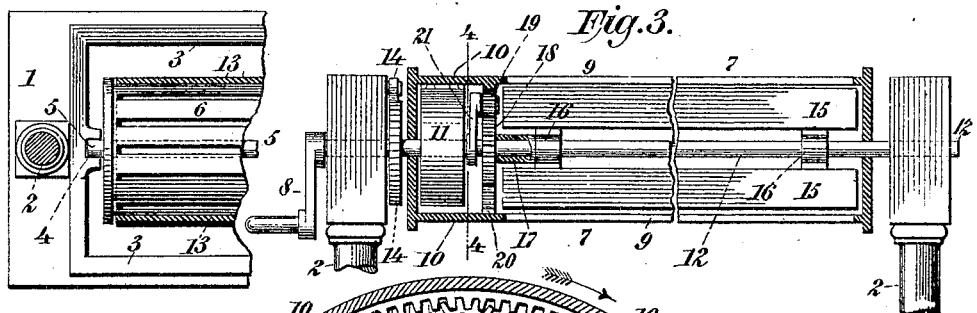
Figure 4:
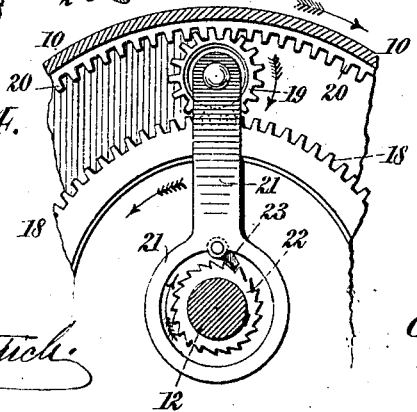

In the drawings, Figure 1 is an elevation showing the device with the parts partially cut away at one end as indicated. Fig. 2 is a sectional view on the line 2—2 of Fig. 1 showing one end of the tank. Fig. 3 is a front view partially in section of the upper parts shown in Fig. 1. Fig. 4 is a sectional view on the line 4—4 of Fig. 3 looking to the right.

Referring to the drawings, in which like numerals designate corresponding parts, 1 is the base of the machine upon which are fixed uprights or posts 2. Upon the base 1 rests the tank 3, the ends of which are provided with grooves 4 engaging the shaft 5 of the lower cylinder 6. The apparatus is provided with a spring driven device within the upper cylinder 7, adapted to be wound by the removable key or crank 8. The cylinder 7 is made of strips 9 except at one end, as indicated, which is in the form of a drum 10. One end of the spring 11 is secured to the interior of drum 10, the other end to shaft 12. To wind the spring 11 the operator grasps cylinder 7 (around which the endless belt of fabric 13 runs as shown) and turns crank 8. The ratchet and pawl device 14 prevents the unwinding of the spring except by the rotation of cylinder 7 about shaft 12. Fans 15 are fixed to collars 16 loose on shaft 12. The sleeve 17 connects one collar 16 to gear wheel 18 loosely carried on shaft 12. The small gear wheel 19 meshes with gear wheel 18 and interior teeth 20 (Fig. 4) within drum 10. The pinion of gear wheel 19 is carried on support 21 loosely hung on shaft 12 as best shown in Fig. 4. Fast upon shaft 12 is ratchet 22 engaged by pawl 23 on support 21. To wind spring 11 shaft 12 is rotated by crank 8 in the direction shown by the arrow (Fig. 4) during which winding the pawl 23 will ride over the teeth of ratchet 22. As the spring unwinds, drum 10 and cylinder 7 will be revolved in the direction shown by the outer arrow in Fig. 4 rotating gear wheels 19 and 18 in the direction indicated to revolve fans 15 to produce circulation of air within cylinder 7 and through its open spaces for the purpose of disseminating the moisture carried by fabric 13. Support 21 being held by pawl 23 in position on shaft 12 (stationary during the unwinding) will retain gear wheel 19 in place to effect the rotation of gear wheel 18, to which the collar 17 is secured. The speed of rotation of fans 15 depends on the relative sizes of gear wheels 18 and 19, which may be varied to produce the desired circulation of air.

The operation of the device so far as not already explained is as follows: The tank 3 is filled with water or disinfecting liquid and the endless belt of fabric 13 is stretched around cylinders 6 and 7 as shown in Fig. 1. The lower cylinder is preferably made of longitudinal strips as shown, so that the liquid may enter the same and more thoroughly permeate the fabric. As the fabric 13 revolves, driven by the rotating upper cylinder 7, the liquid carried thereby is so exposed to the atmosphere as to mingle therewith and produce the desired result of moistening the air or disinfecting the same according to the qualities of the liquid used. The rotation of cylinder 7 is slow, so that a given point on the fabric 13 has time to dry more or less and disseminate its moisture to the atmosphere before its return to the tank 3 for submersion and wetting. The lower cylinder 6 serves to retain the lower portion of the fabric 13 in the liquid, but said cylinder has no fixed bearings so that shrinkage of the fabric is provided for and the endless belt of fabric need not be made accurately as to length.

The fabric 13 may be ornamented with views or verses to amuse a sick person or with periods of time so that the patient may keep track of the hours when medicine may be taken.

What we claim as our invention is:

1. In an air purifying device, a tank, an endless belt of fabric, a lower cylinder carried therein, an upper cylinder with many openings, a shaft therefor, means within the upper cylinder for rotating it around its shaft, a fan carried within the upper cylinder upon the same shaft and means within said cylinder to rotate said fan simultaneously with said cylinder at greater speed than the cylinder rotates.

2. In an air purifying device, an endless belt of fabric, a driving cylinder, a shaft therefor, a spring having one end secured to the cylinder and the other to the shaft, a rotating fan within said cylinder carried on said shaft and means within said cylinder whereby the unwinding of said spring rotates said cylinder and also rotates said fan simultaneously at greater speed.

3. In an air purifying device, an endless belt of fabric, a driving cylinder therein provided with openings, a fan within the driving cylinder, means to rotate the driving cylinder, and means to rotate simultaneously the fan.

Signed at New York in the county of New York and State of New York this 2nd day of March A. D. 1905.

CHAS. E. DRESSLER.
ROBERT DRESSLER.

Witnesses:
M. L. CHETEJIAN.
JOSEPH A. STETSON.